Dec. 19, 1961  G. C. PAXTON  3,013,680
AUTOMATIC BOX DESTACKING AND DUMPING MACHINE
Filed May 18, 1959  16 Sheets-Sheet 9
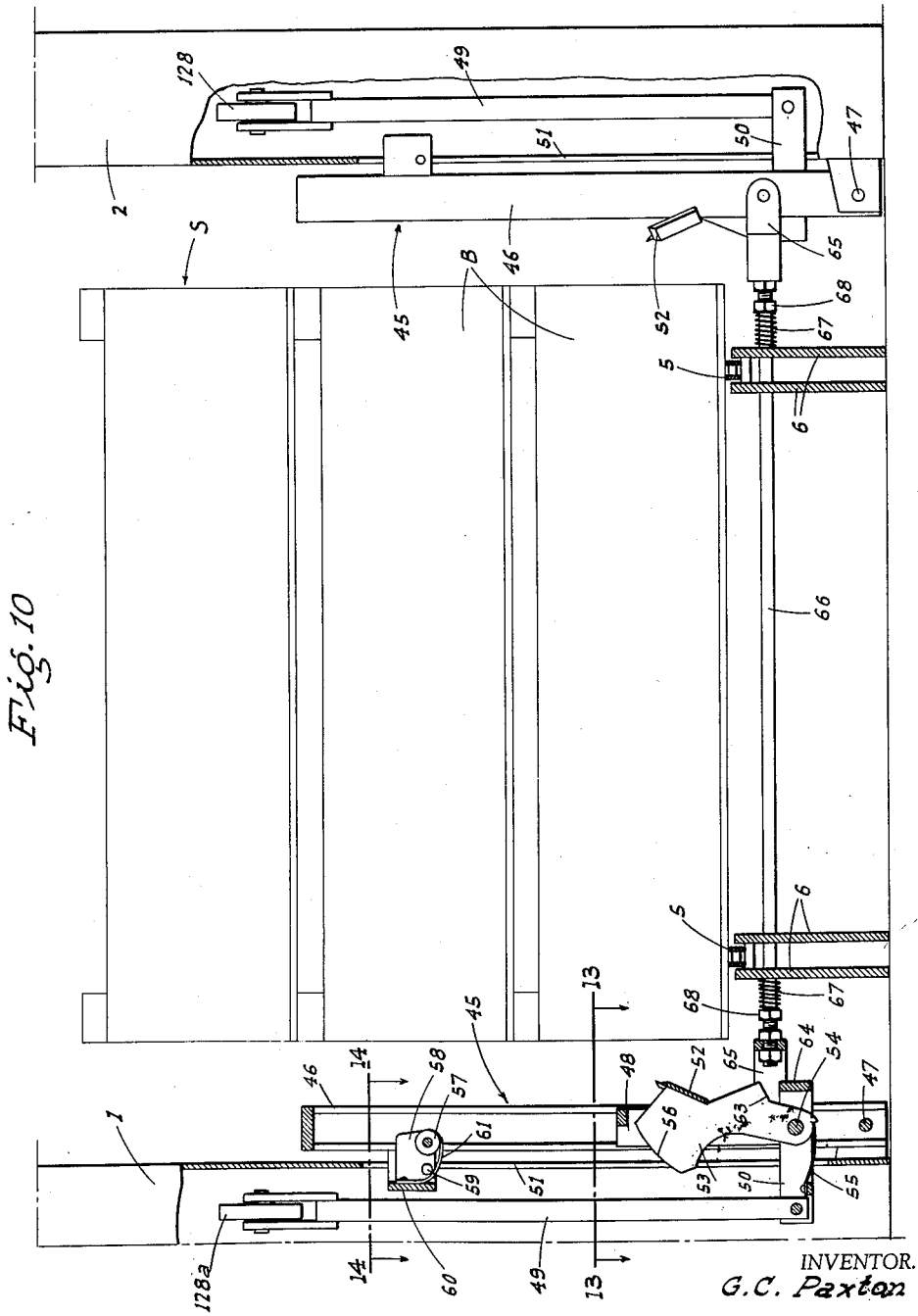
INVENTOR.
G.C. Paxton
BY Webster & Webster
ATTYS.

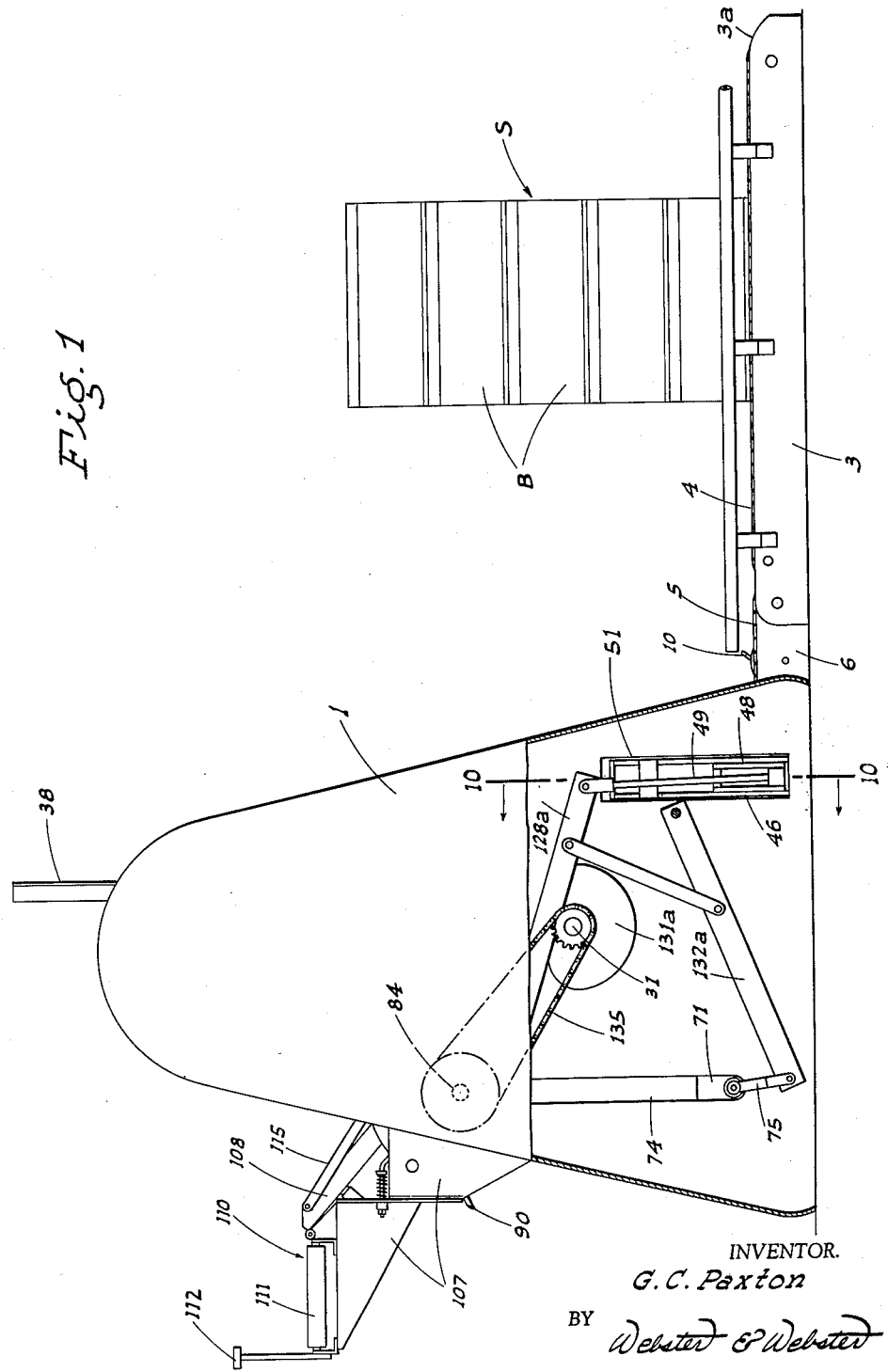

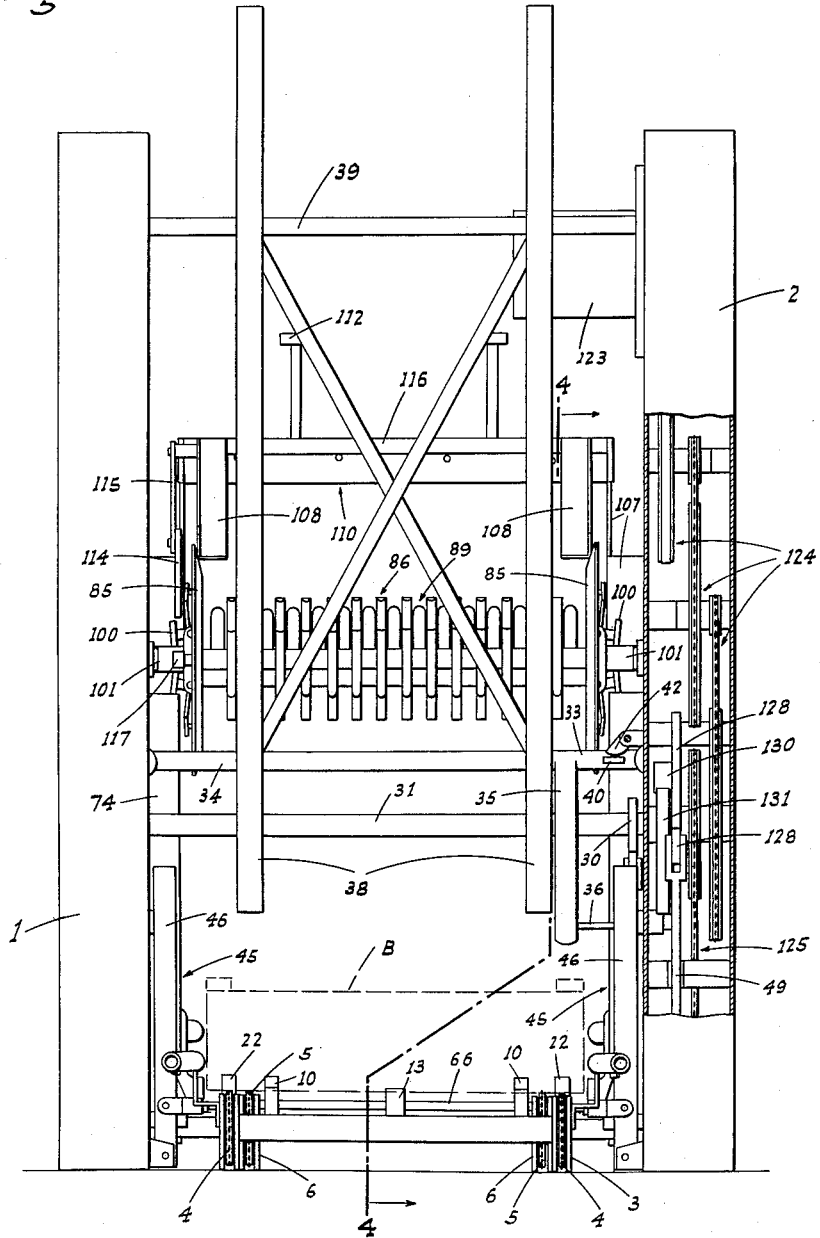

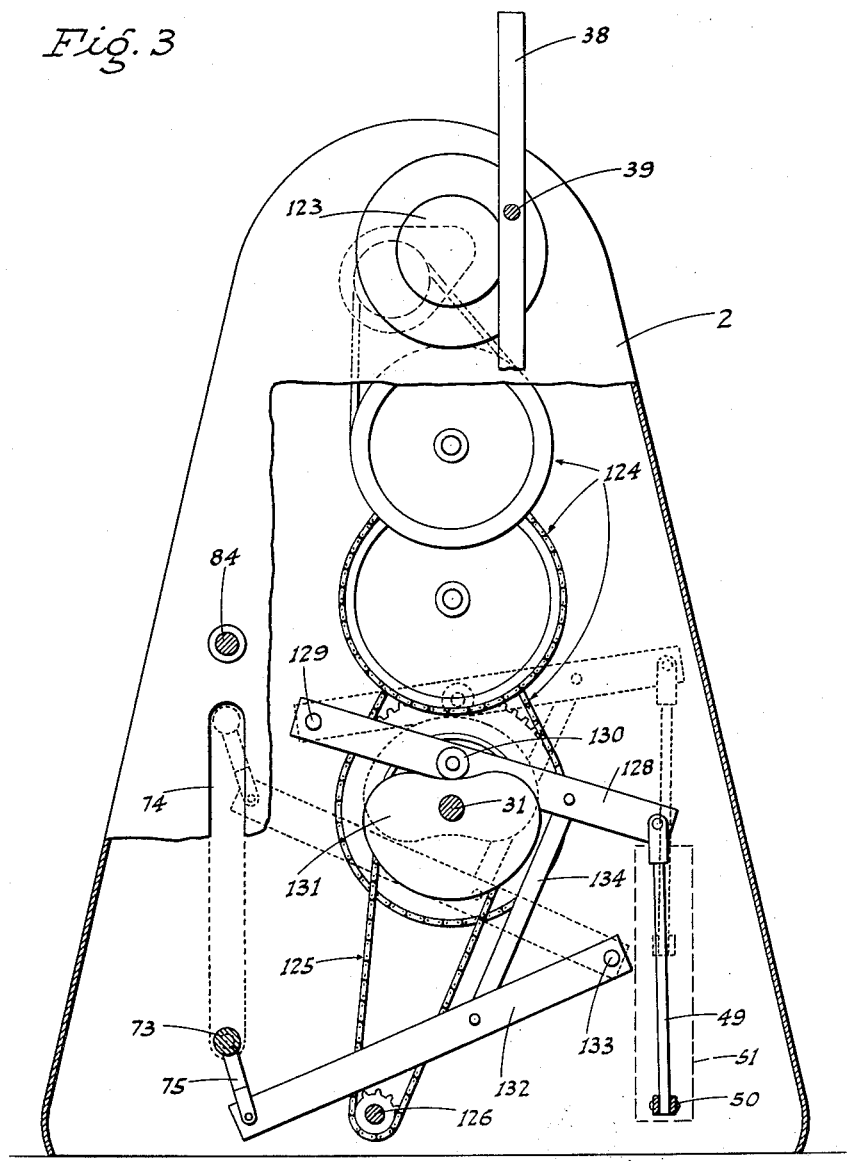

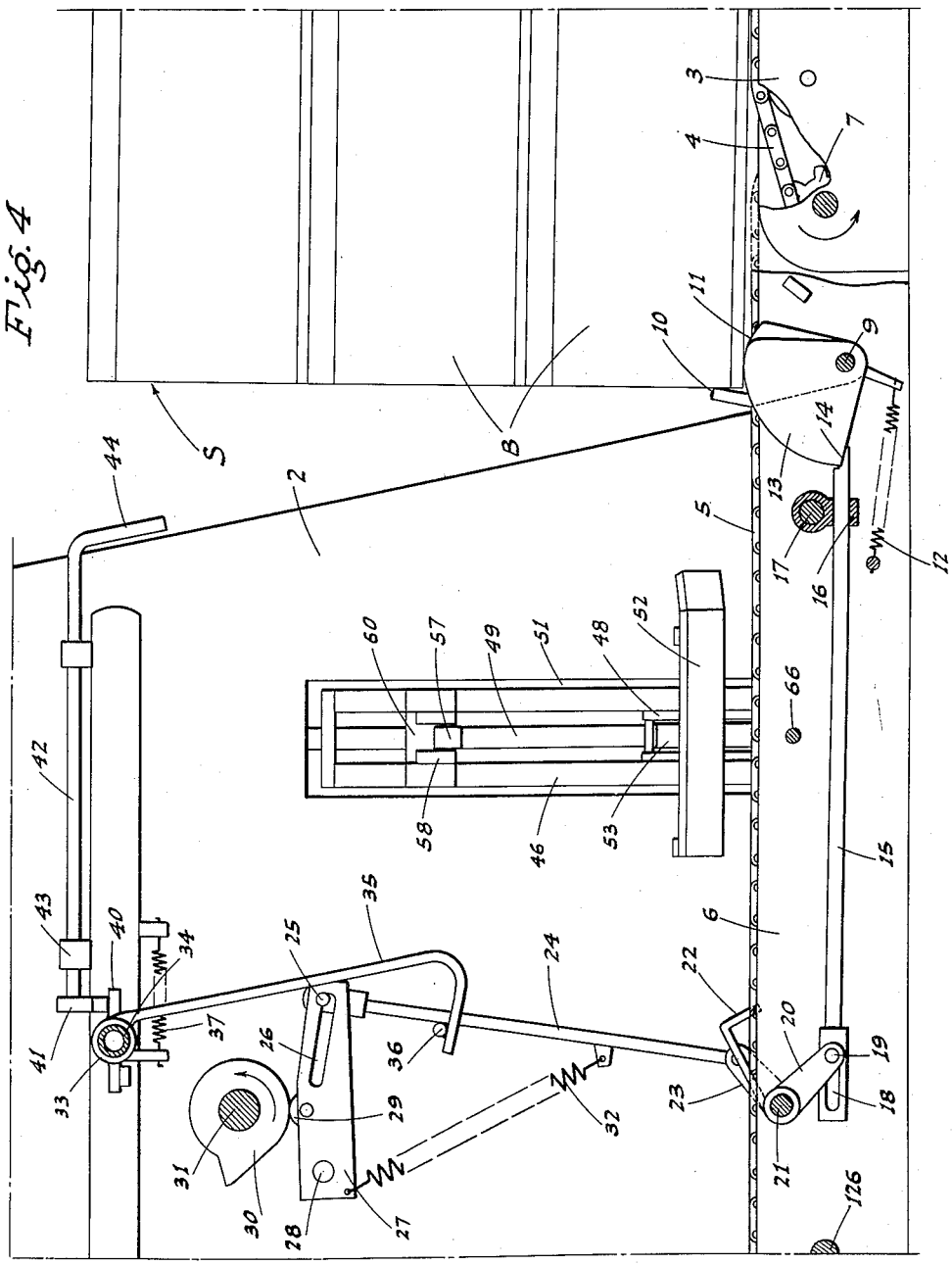

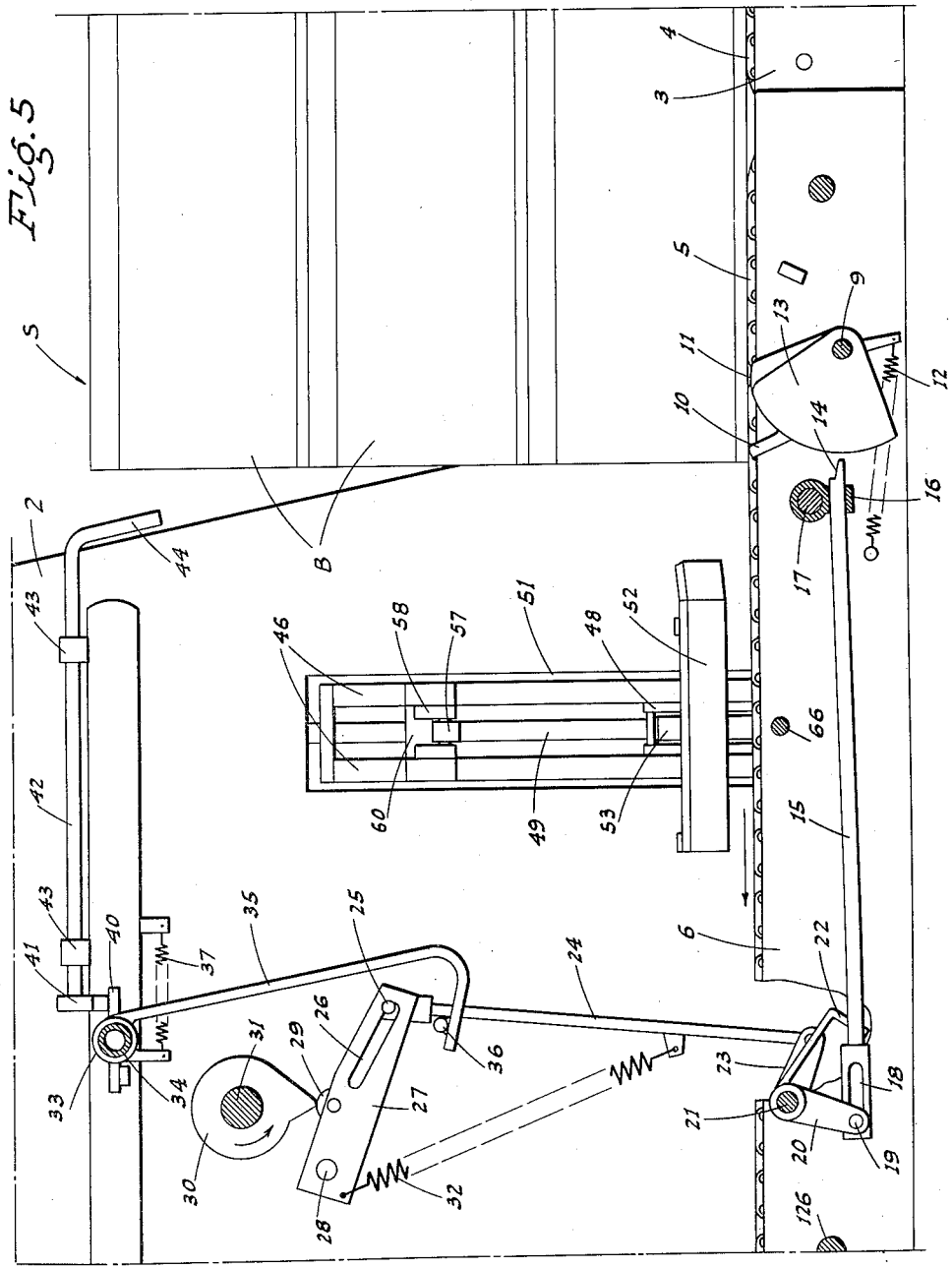

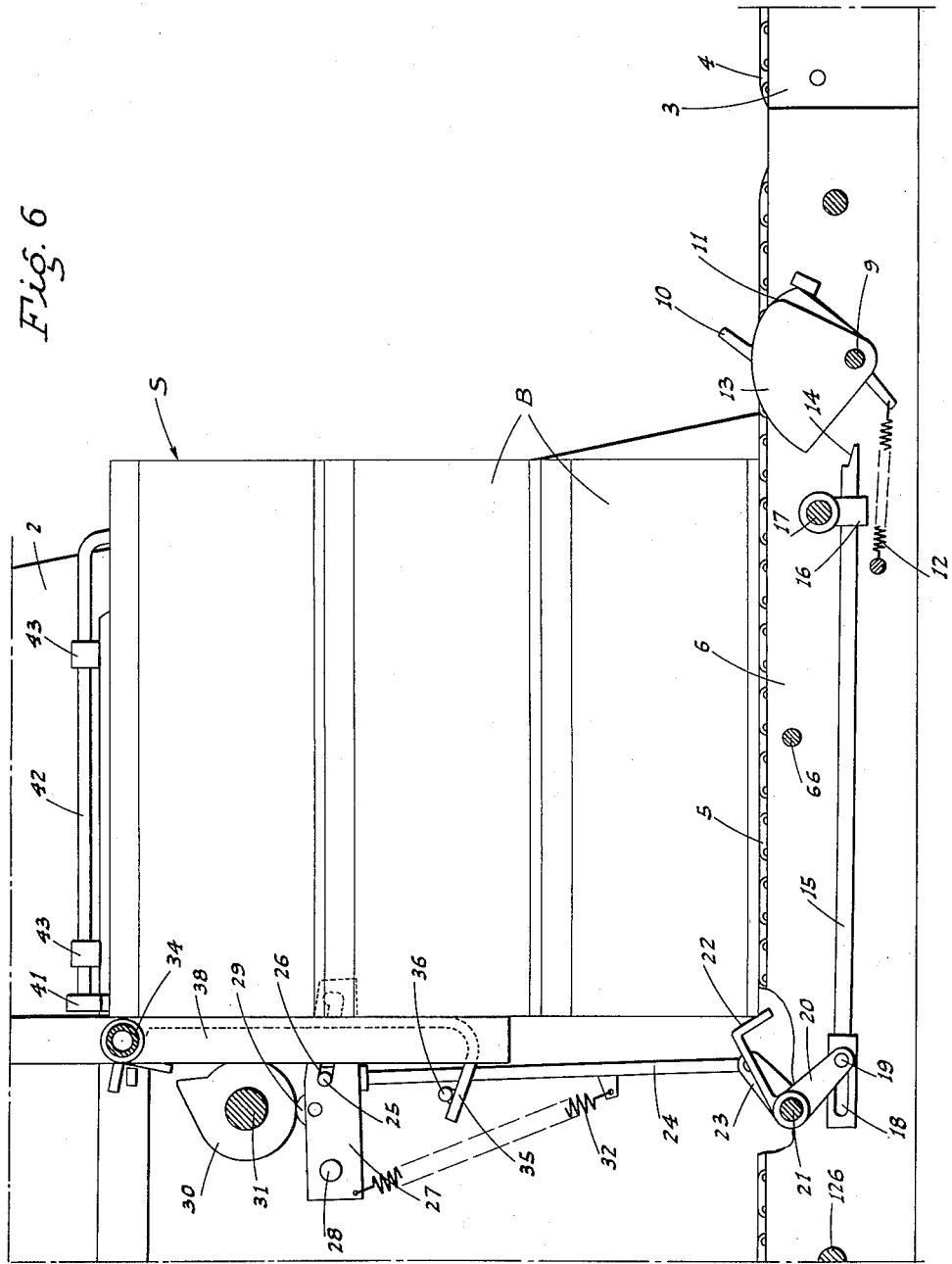

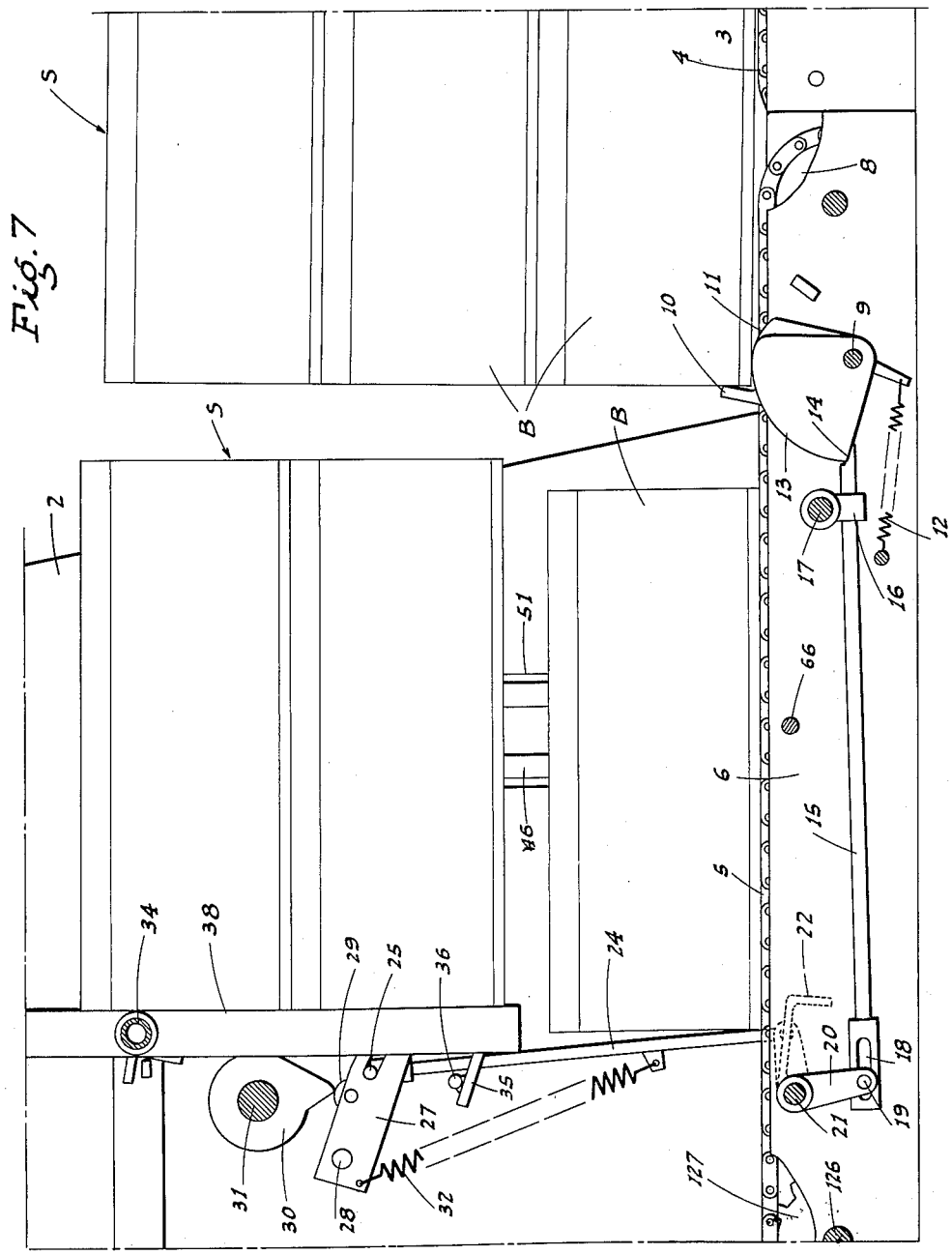

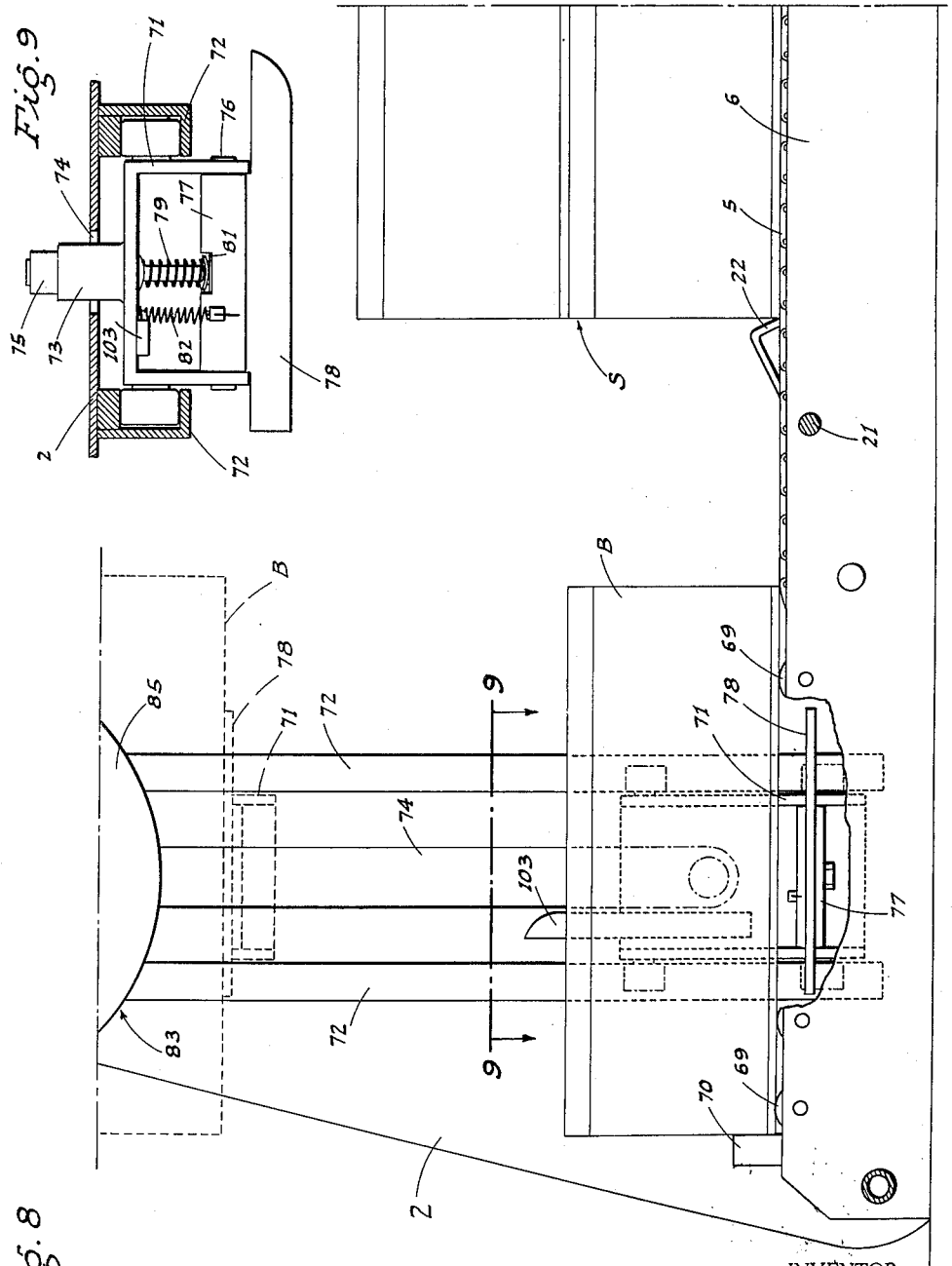

Dec. 19, 1961 G. C. PAXTON 3,013,680
AUTOMATIC BOX DESTACKING AND DUMPING MACHINE
Filed May 18, 1959 16 Sheets-Sheet 10

INVENTOR.
G.C. Paxton
BY Webster & Webster
ATTYS.

Dec. 19, 1961  G. C. PAXTON  3,013,680
AUTOMATIC BOX DESTACKING AND DUMPING MACHINE
Filed May 18, 1959  16 Sheets-Sheet 11
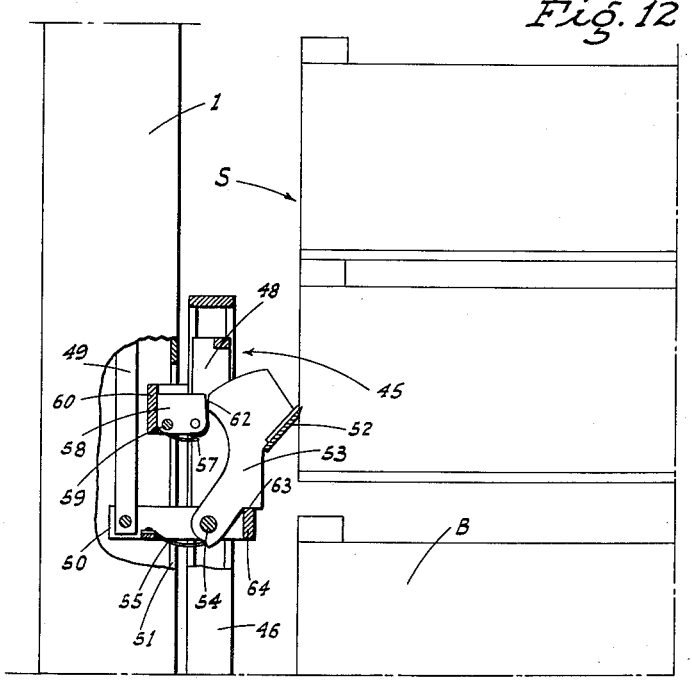
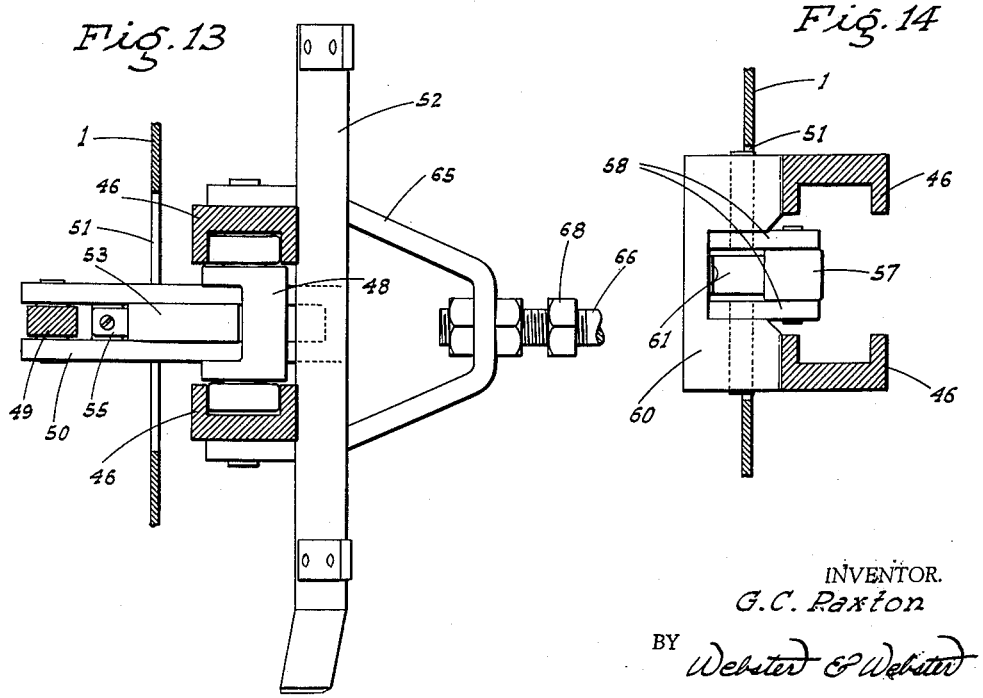
INVENTOR.
G.C. Paxton
BY Webster & Webster
ATTYS.

Dec. 19, 1961        G. C. PAXTON        3,013,680
AUTOMATIC BOX DESTACKING AND DUMPING MACHINE

Filed May 18, 1959        16 Sheets-Sheet 12

INVENTOR.
G. C. Paxton
BY Webster & Webster
ATTYS.

Dec. 19, 1961  G. C. PAXTON  3,013,680
AUTOMATIC BOX DESTACKING AND DUMPING MACHINE
Filed May 18, 1959  16 Sheets-Sheet 16

INVENTOR.
G.C. Paxton
BY
Webster & Webster
ATTYS.

United States Patent Office 3,013,680
Patented Dec. 19, 1961

3,013,680
AUTOMATIC BOX DESTACKING AND
DUMPING MACHINE
Gerald C. Paxton, Sanger, Calif., assignor to General Nailing Machine Corporation, Sanger, Calif., a corporation of California
Filed May 18, 1959, Ser. No. 813,965
12 Claims. (Cl. 214—307)

This invention relates to a machine for destacking and dumping boxes loaded with produce from the field; the major object of the invention being to provide a machine by means of which each box of a stack as initially placed on the machine will in turn be withdrawn from the stack and then inverted to discharge the load thereof.

Another object of the invention is to provide automatically functioning stop means which will prevent the feeding of a stack of boxes, to the station at which destacking or stack razing operations take place, until the boxes of a stack already in place at said station have been disposed of.

A further object of the invention is to arrange the destacking mechanism so that the lowest box of the stack is in all cases the one fed to the station on the machine at which the dumping mechanism takes over, and such box is elevated for dumping to a level such that the dumped produce will then be in a position convenient for subsequent handling by graders, packers, and the like.

In connection with the load discharging mechanism of the machine, a further object of the invention is to arrange the load discharging or box-dumping mechanism so that the produce is discharged progressively from the box in a manner to prevent piling, and a smooth and gentle flow is assured. This is of particular value and importance when easily damaged produce—such as peaches—is being handled.

A further object of the invention is to provide hand means for selectively controlling the release of the stops, which normally hold back a stack of boxes following the one which is being destacked or razed, and which are normally automatically released upon the destacking of such one stack of boxes being completed. By reason of this feature, any selected stack may be held back by the operator for as long as may be desired, as when it is wanted to separate the processing of produce of two different kinds, or belonging to separate owners.

A further object of the invention is to provide a machine for the purpose in which the stack advancing, destacking, and dumping operations take place in a continuous order without any intermediate handling or manipulation on the part of an operator being necessary.

Also, the complete machine is of such construction that while of large box-handling capacity, it is quite compact, and may be readily made so as to be portable if desired.

Still another object of the invention is to provide a practical, reliable, and durable automatic box destacking and dumping machine, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of the machine, partly broken away and in section.

FIG. 2 is a rear end elevation of the machine.

FIG. 3 is a side elevation of one of the frame housings, partly broken out and in section, and showing the drive mechanism of the machine.

FIG. 4 is an enlarged fragmentary sectional elevation of the stack entry end of the machine, taken substantially on line 4—4 of FIG. 2, and showing a stack engaged with the rear stops.

FIG. 5 is a similar view, showing the stops as released and the stack advancing.

FIG. 6 is a similar view showing the stack as fully advanced and engaged by the forward stops.

FIG. 7 is a similar view, showing the stack, except the lower box thereof, lifted, and the lower box advancing beyond the forward stops, which have been released.

FIG. 8 is a similar view, but taken at the forward end of the machine, and showing a fully advanced box in position to be lifted.

FIG. 9 is a cross section on line 9—9 of FIG. 8.

FIG. 10 is an enlarged fragmentary transverse section of the machine, taken substantially on line 10—10 of FIG. 1, and showing the initial position of the stack lifters.

FIG. 12 is a similar view, but of one side only of the machine, and showing the stack as lifted.

FIG. 13 is an enlarged sectional plan on line 13—13 of FIG. 10.

FIG. 14 is a similar view on line 14—14 of FIG. 10.

Figure 11:
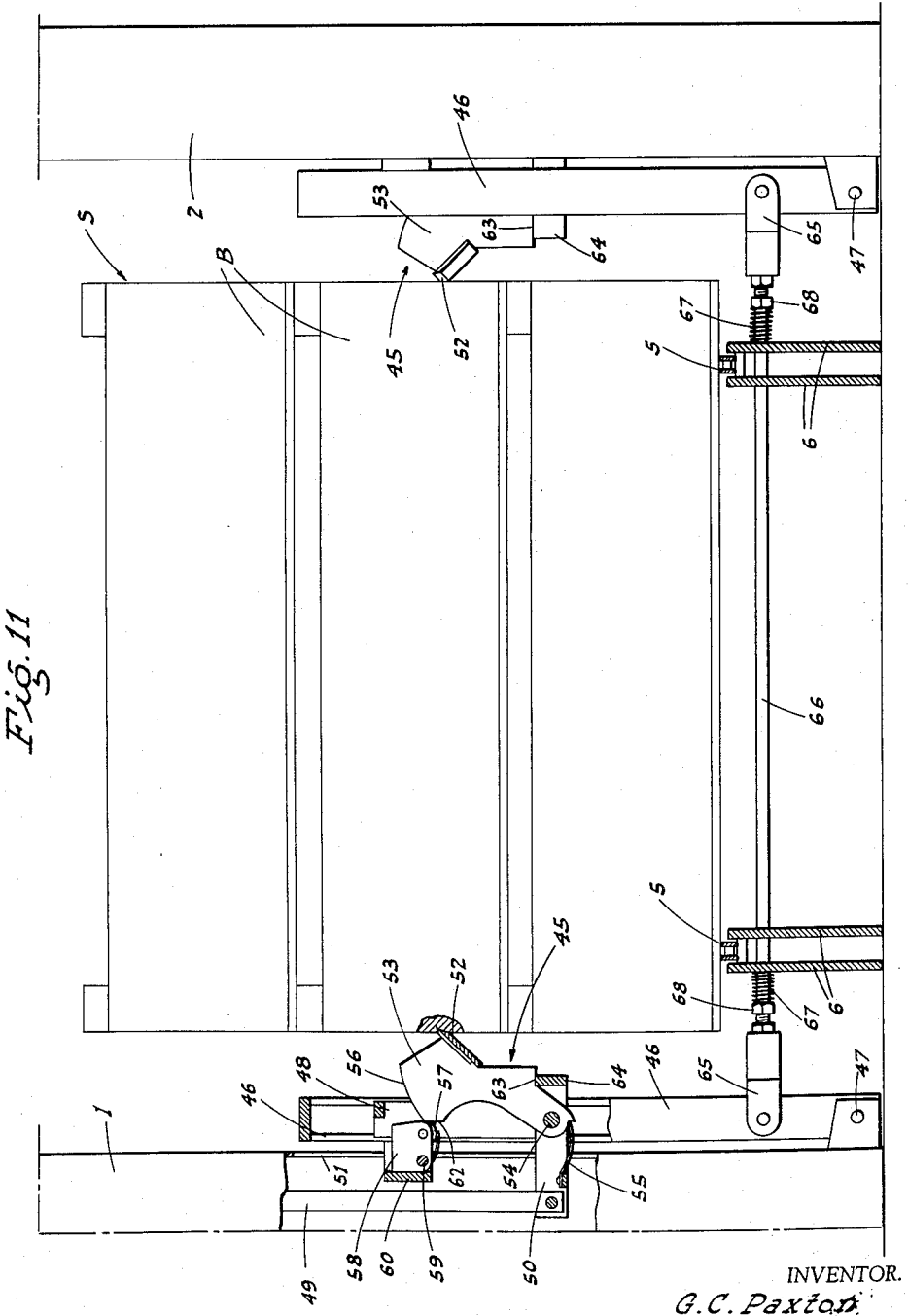
FIG. 11 is a similar view, showing the lifters as initially engaged with the stack.

Referring now more particularly to the drawings, and to the characters of reference marked thereon, the frame of the machine consists essentially of a pair of rigid upstanding housings 1 and 2 spaced apart transversely a distance considerably greater than the length of boxes B to be handled in the machine, and which are of the type known generally as field lugs.

Disposed to the rear of the housing are transversely spaced longitudinal supports 3 for endless chains 4; the upper runs of which support the stack S of boxes placed thereon and advance the same toward the housings by frictional contact. These chains deliver onto the upper runs of other similar chains 5 which extend part way the length of the housings, as will be hereinafter seen.

Chains 5 are mounted between the upstanding supporting rails 6; the adjacent ends of chains 4 and 5 overlapping and being engaged at such ends by connected sprockets 7 and 8, respectively (see Figs. 4 and 7). Sprockets 7 are smaller than sprockets 8, so that chains 4 travel at a slower speed than chains 5, which are constantly driven in the manner later described.

Mounted on a cross shaft 9 journaled in the rails 6 below the upper runs of chains 5 and adjacent the forward end of chains 4 are transversely spaced rear stops 10 arranged to project into the path of a stack S boxes advancing on chains 4.

Each stop includes and upstands from a substantially horizontal but convexly curved surface 11 which normally projects above the chains 5 a short distance, as shown for instance in FIG. 4. By reason of this feature, the lowest box of the stack being advanced by the chains 4 becomes elevated slightly at its forward end as it engages the surfaces 11 before actually engaging the stops 10, as shown in FIG. 4, and some of the load is taken off the chains 4.

A tension spring 12 is operatively connected to shaft 9 to rotate the same in a direction to move the stops 10 rearwardly a certain distance from their stack holding position, as shown in FIG. 6.

Forward rotation of shaft 9 and corresponding forward movement of stops 10 from a stack holding position is normally prevented by the engagement of a stop boss 13 with a seat 14 on the rear end of a longitudinally movable holding rod 15. Adjacent its rear end the rod 15 is slidably supported in a sleeve 16 mounted on a rail-supported cross bar 17. At is forward end, rod 15 is provided with a longitudinal slot 18, which is engaged by a pin 19 on the lower end of an arm 20 depending from a cross shaft 21 journaled in rails 6 below the upper arms of chains 5.

Front stack or box stops 22 are rigid with shaft 21 a short distance rearwardly thereof and are arranged to project above chains 5 when the pin 19 is at the rear end of slot 18, as shown in FIGS. 4 and 6. The distance between the front and rear stops is somewhat greater than the width of a box B; said front stop defining the destacking station of the machine.

Adjacent the housing 2, the shaft 21 is provided with an upstanding but rearwardly sloping arm 23 to which an upstanding push rod 24 is connected. At its upper end, rod 24 is provided with a cross pin 25 working along a longitudinal slot 26 formed in a generally horizontal bar 27, which is pivoted at its forward end, as at 28, on the adjacent wall of housing 2.

Intermediate its ends, the bar 27 carries a roller 29 engaged by a cam 30 mounted on a cam shaft 31 journaled in and extending between housings 1 and 2, and constantly rotated by mechanism within housing 2, as will be seen later. A tension spring 32 connects bar 27 and rod 24 in such a manner as to urge the roller 29 against the cam 30 and also tend to pull the rod 24 forwardly so as to shift the cross pin 25 toward the forward end of the slot 26.

A sleeve 33 is turnably supported on a cross rod 34 above and to the rear of shaft 31, and which connects housings 1 and 2. An arm 35 is rigid with and depends from said sleeve in the path of a stack S; the arm at its lower end being above the chains 5 a distance greater than the height of a single box. Said arm is normally disposed at a rearward slope, and at its lower end supports a laterally projecting holding rod 36 which overlies the rod 24 on its front side. A suitable spring 37 acts on sleeve 33 so that rod 36 normally engages the rod 24; yieldably holding the latter at the rear end of slot 26 against the resistance of spring 32 which tends to pull said rod forwardly.

The arrangement of parts of the mechanism which actuates the holding rod 15 of the rear stop is such that once with each rotation of cam 30, and when the push rod 24 is held at the rear end of the slot 26, as above described, the front stop 22 is lowered below the chains 5 and at the same time the cross pin 19 moves to the front end of slot 18 and pulls rod 15 forwardly. This releases said rod from holding engagement with the stop boss 13, as shown in FIG. 5, and allows the frictional contact of the conveyor chains 4 and 5 with the lowest box of the stack to be again effective, so that said box pushes the rear stops 10 ahead and lowers the same, and the stack will be advanced until said lowest box thereof engages the front stops 22.

At the same time, the upper boxes of the stack engage vertical stop rails 38 supported by the cross rod 34 and by another similar rod 39 above (see FIG. 2 particularly). Just before the stack engages the stop rails, it engages and pushes the arm 35 forwardly to a vertical position, as shown in FIG. 6. This releases the lateral holding rod 36 from contact with the push rod 24 so that spring 32 will then act to shift said rod to the front of the slot 26. Then when the cam 30 functions to swing bar 27 down and lower the push rod 24, the stops 22 will be lowered, but no movement will be imparted to rod 15, as indicated in FIG. 7. This is because the length of the stroke imparted to the push rod 24 is then relatively short, due to the closeness of the forward end of slot 26 to the bar pivot 28, and as a result the arm 20 is swung an insufficient distance to move the cross pin 19 to the end of slot 18.

It will thus be seen that any subsequent stack S reaching and engaging the rear stops 10 will not be released for advance until all but the bottom one of a stack ahead has been disposed of and the arm 35 has been released to again move the push rod 24 to its rearmost position.

The same action, as regards the stops 10 from being released, may be manually obtained by the following simple arrangement:

Projecting from the rear side of sleeve 33 is a lug 40. A cam 41 overlies this lug and is mounted on a shaft 42 journaled in bearings 43 mounted on housing 2. This shaft extends to the rear end of the housing 2 and is there formed with a handle 44 so that the shaft and cam may be turned. It will thus be seen that the arm 35 may be swung forwardly to disengage the push rod 24 and allow the same to assume a short-stroke position without said rod being engaged by a stack. A succeeding stack may thus be held back as long as may be required, as when it is desired to separate the processing of produce of different kinds, or of different owners.

The conveyor supports 3 maintain the conveyor at an above-floor level such that the conveyor may be loaded with a stack carried on a conventional hand truck. To make such loading convenient for the truck handler, the supports 3 at their outer end and immediately adjacent the inception of the conveyor chains 4, are formed on their upper edges with downwardly curving faces 3a (see FIG. 1). This enables the bottom of the stack to be rested against and supported by said faces when the stack and truck are disposed at a tilt away from the conveyor, so that the stack may then be readily swung by the operator to an upright position and onto the conveyor.

When a stack of boxes has reached and is engaging the front stops 22 and stop rails 38, the stack is gradually razed and the boxes are allowed to advance one by one from a stop engaging position and in spaced order by the following mechanism, as shown in FIGS. 4 and 5, and more particularly in FIGS. 10 to 14.

Such mechanism comprises a pair of transversely spaced stack lifter units, indicated generally at 45, and since the units are identical, a detailed description of one will suffice for both.

Each such unit comprises a pair of guide rails 46 spaced apart lengthwise of the machine and disposed in facing relation. These rails are positioned between one of the frame housings and the adjacent end edges of the boxes of the stack, and are pivoted at their lower end in connection with said housing, as at 47. The rails for each unit 45 are rigidly connected and form a rail unit.

A vertically movable carriage 48 is disposed between and guided by the rails 46; such movement being imparted thereto by a reciprocating link 49 connected to a lateral extension 50 on the lower end of the carriage and projecting through a vertical slot 51 in the inner wall of the adjacent frame housing. The link 49 is thus inside the housing, being reciprocated by means described later.

A sharp-edged lifter blade 52 extends horizontally and lengthwise of the machine laterally inward from the carriage and is mounted intermediate its ends on a depending arm 53 pivoted at its lower end on the carriage, as shown at 54.

A spring 55 between the carriage 48 and arm 53 acts to yieldably hold the latter substantially vertical and so that the blade 52 is clear of the ends of the boxes, as shown for instance in FIG. 10.

The top edge of the arm 53 is formed as a cam surface 56 engageable with a roller 57 mounted between side flanges 58 which are pivoted, as at 59, in a cage 60 rigid with rails 46. The flanges 58 are arranged so as to be incapable of upward swinging movement from a normal position, but can swing down from such position, being yieldably held from such swinging by a spring 61.

The carriage when at its lowest position maintains the blade 52 below the second box from the bottom of the stack, as shown in FIG. 10.

Upon the carriage being raised until the blade 52 is in a position between the top and bottom of said second box, the cam surface 56 engages the roller 57, and the arm 53 is swung laterally inward until the blade bites into the box end; said blade being then disposed at an acute upward angle to the box, as shown in FIG. 11.

Full impingement of the blade with—and the biting thereof into—the wooden end of the box is had when the laterally outer end of the cam surface 56 of arm 53 engages the roller.

Further upward movement of the carriage and blade then lifts the stack, except for the bottom box, which is left supported on the conveyor chains 5, as shown in FIG. 12. With such further movement of the carriage, the roller 57 engages a short vertical face 62 depending from the laterally outer end of the cam surface 56 for a short portion of such further movement, and which insures the blade 52 having a secure bite into the wood of the box ends. By the time the arm 53 has reached the top of its stroke the face 62 is above and clear of the roller 57, as shown in FIG. 12. At this time the arm 53 is held against possible downward swinging in a laterally inward direction by the engagement of a horizontal shoulder 63 on the arm 53 with a cross bar 64 on the carriage.

Upon the subsequent downward movement of the lifter carriage the arm 53 moves past the roller 57 without being affected thereby, and the stack remains supported by the blade 52 until the box engaged by said blade—and which is then the lowest one of the stack—engages and seats on the chains 5.

The carriage, however, has not then reached the bottom of its stroke, so that with the further downward movement of the carriage—after the stack is seated—the blade 52 pulls free of the box end, and the spring 55 then functions to pull the arm 53 and blade 52 to their initial position away from the box.

While the stack is lifted from the lowest box, as above described, the cam 30 again functions to depress bar 27 and the stops 22, so that said lowest box—engaged by the constantly moving chains 5—is advanced to a pick-up point ahead of the stops before the stack is again lowered. When, however, there is no box left to be lifted, the cam arm 53—when moving to the top of its stroke, and then dwelling for a certain length of time—will swing laterally out from its normal box-engaging position so that the blade 52 is not in the way of the following stack then moving into the destacking station. The spring 55 of course acts to thus swing the arm 53, and said spring—being stronger than spring 61—causes the arm, as it descends, to deflect the mounting flanges 58 of the roller 57 so that said arm 53 holds its laterally offset position as it descends.

It will of course be understood that the lifting units on both sides of the machine function simultaneously so that the stack is lifted and lowered evenly.

While the ends of the boxes of the stack are presumed to be alined, it sometimes occurs that they are shifted laterally in the stack. In order to compensate for any such misalinement of any box to be engaged by the stack lifters, the pivoted guide rail units 46 of the two lifter units are connected together for lateral floating in unison, so that the carriages and box engaging members mounted on said rail units are correspondingly shifted laterally while being maintained in the same spaced relation.

This connection of the rail units is accomplished in the following manner:

Pivotally connected to—and projecting laterally inward from—the rail units are yokes 65 disposed at a level above pivots 47 but below chains 5. A cross rod 66 connects the yokes and slidably projects through the chain mounting rails 6. Compression springs 67 on the rods between the laterally outer rails 6 and stops 68 on the rod hold the rail units 46 in a normal vertical position, while allowing them to float or be deflected laterally, at the lateral setting of any box may require.

After the bottom box of the stack has been advanced beyond stops 22, as previously described, it is pushed by chains 5 onto supporting rollers 69 and against stops 70, and said box is then at the dumping station in position to be picked up and raised into engagement with the rotary box upsetter or inverter and dumping unit of the machine, later described.

The box pick-up devices, of which there are two—one on each side of the machine, and of identical construction—each comprises a carriage 71 guided for vertical movement between fixed guide rails 72 secured against the adjacent wall of the corresponding frame housing.

The carriage, which is of laterally inwardly facing channel form in section, as shown in FIG. 9, is provided on its back with a boss 73 which projects into said frame housing through a vertical slot 74 in the adjacent wall thereof, and is connected inside the housing to a depending link 75 reciprocated in the manner hereinafter described.

Figure 15:
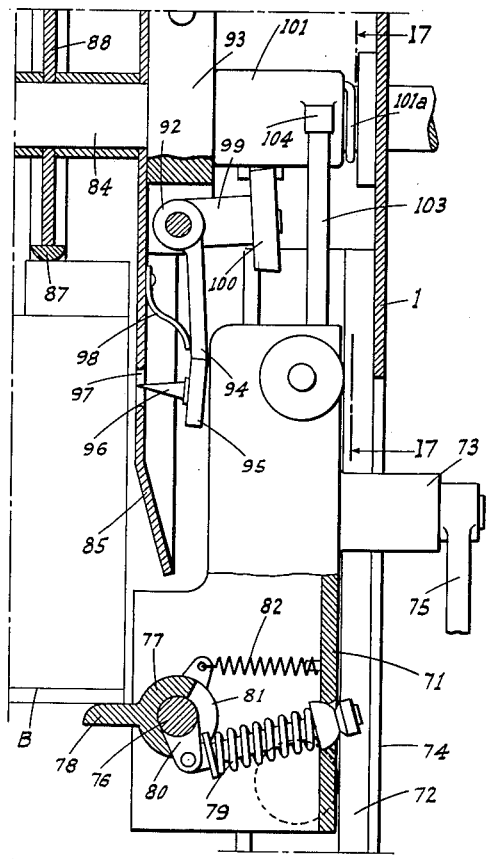
FIG. 15 is an enlarged transverse view of one of the box lifters and the adjacent portion of the rotary box dumping unit, partly in section and showing a box as lifted into engagement with said unit.

Journaled in the carriage transversely thereof, but lengthwise of the machine and toward the lower end of said carriage, is a shaft 76 turnable on which is a sleeve 77 which carries a longitudinal and normally horizontal lip 78 adapted to project under the box at one end thereof in lifting relation, as shown in FIG. 15. Rotation of the sleeve on the shaft, and of the latter, is prevented—unless the load on the flange exceeds the weight of the box—by means of a heavy compression spring 79 extending between the back of the carriage and a radial arm 80 rigid with and depending from the shaft.

The arm 80 rides in an arcuate slot 81 in the sleeve; said arm bearing against one end of the slot when the lip 78 is in a box-engaging position and the sleeve being yieldably held in such position by a light compression spring 82 connected between said sleeve and the back wall of the carriage. When the carriage is in its lowest position the lip 78 is below a box on the rollers 69, as shown in FIG. 8.

The rotary box inverting and dumping unit to which the box as raised is delivered is denoted generally at 83, and is constructed as follows:

A transverse driven shaft 84 is journaled in and extends between housings 1 and 2 at a level above the point to which a box is raised, and is centered relative to the carriage in a direction lengthwise of the machine. Fixed on the shaft are transversely spaced discs 85 arranged to overlap the ends of the raised box in somewhat close relation thereto, as shown in FIG. 15.

Figure 22:
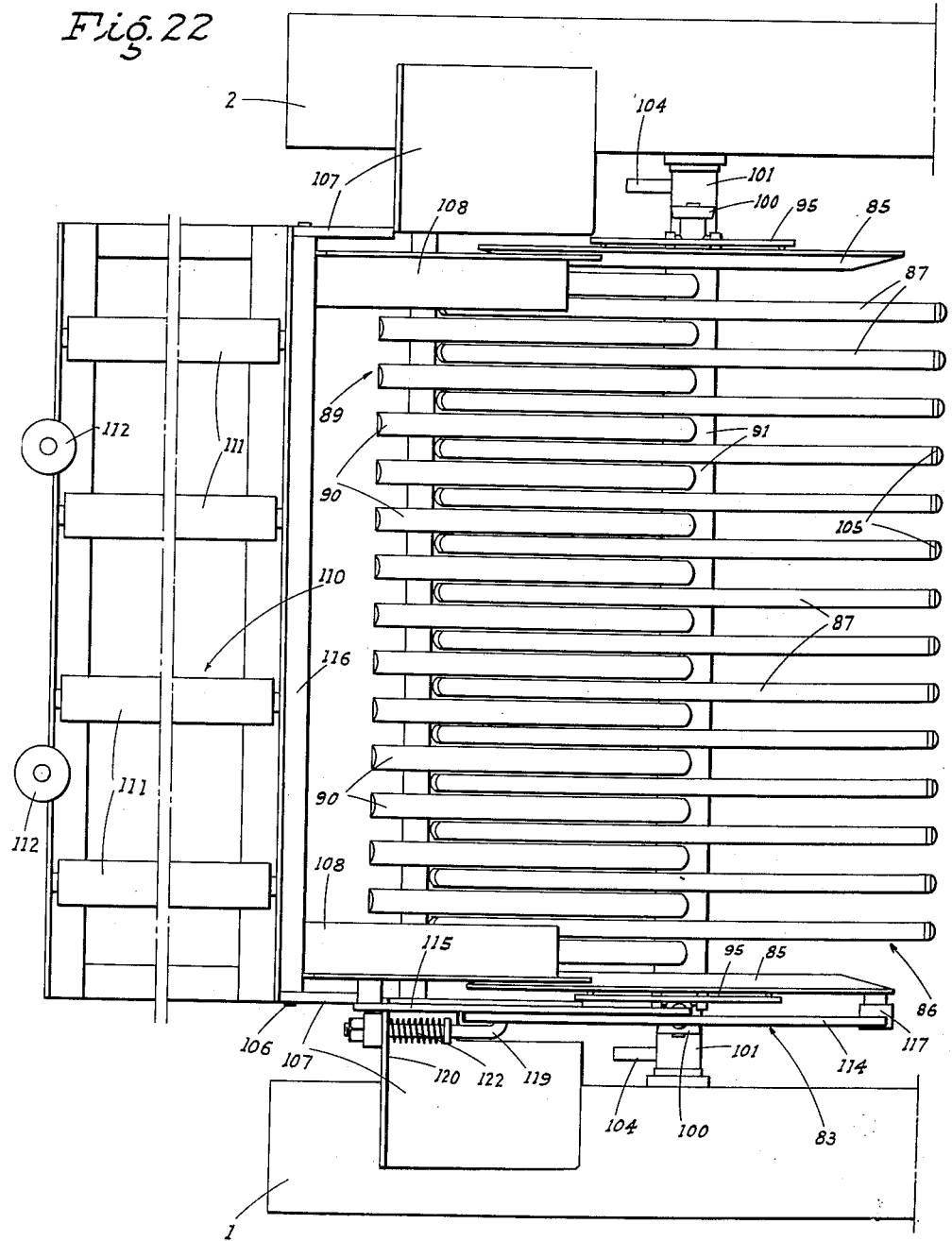
FIG. 22 is a fragmentary top plan view of the box upsetting and transfer unit.

Disposed on opposite sides of the shaft 84 and extending substantially the full distance between the discs 85, as shown in FIG. 22, are rotary box supporting grates parallel to each other and indicated generally at 86. These grates comprise a plurality of bars 87 extending lengthwise of the machine in spaced relation to each other. Opposed ones of the bars are connected by a plate 88 splined on the shaft 84 so as to turn therewith.

Figure 19:
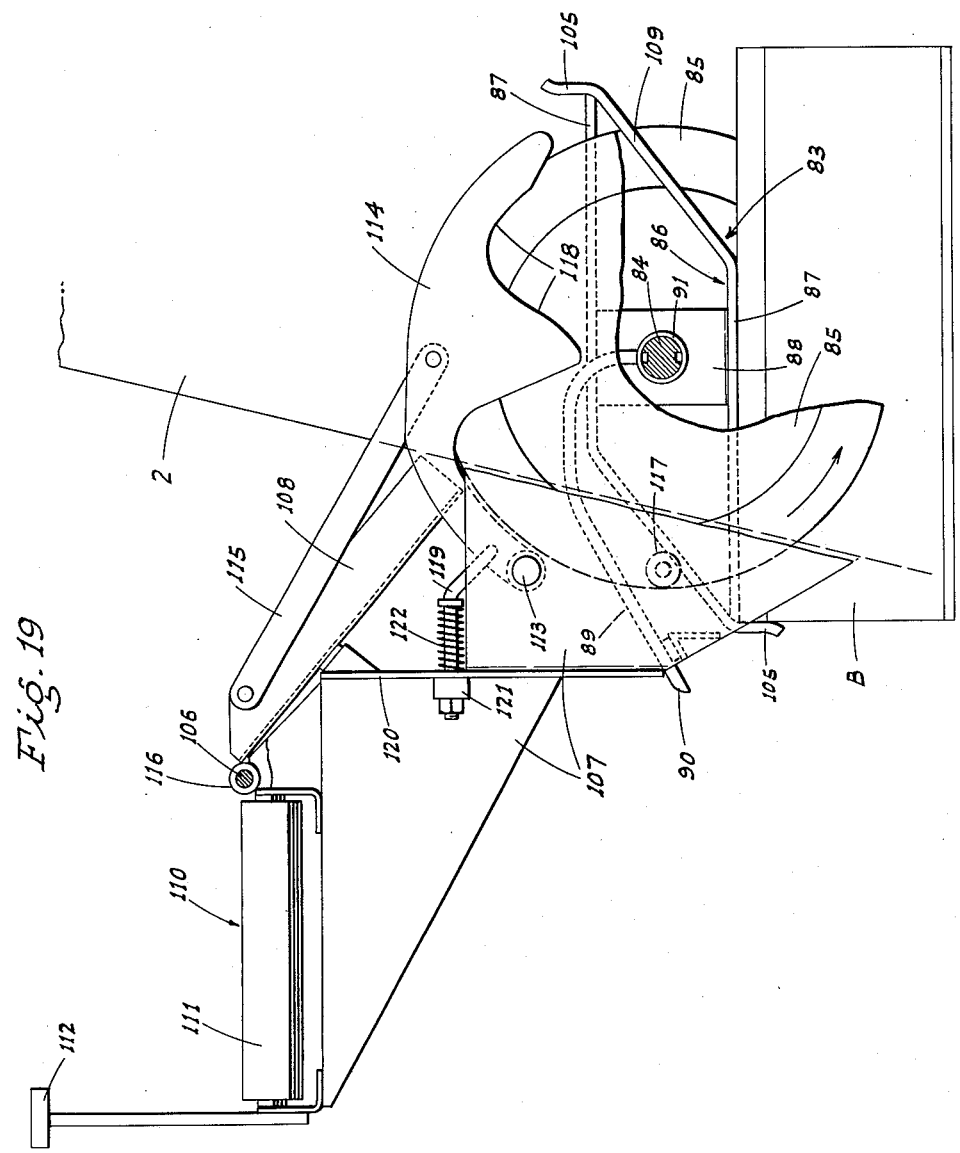
FIG. 19 is a side view, partly broken away and in section, of the box upsetting and dumping unit, showing a box as initially engaged with the rotary upsetting member.

A stationary produce deflecting and discharge grate, indicated generally at 89, is associated with the rotary grates, and comprises bars 90 disposed between bars 87. The bars 90 are mainly somewhat above the upper one of the grates 86 when the latter is horizontal, as indicated for instance in FIG. 19, and at their rear ends depend to connection with individual sleeves 91 relatively turnable on shaft 84 between the plates 88. The rear end portion of the grate 89 slopes downwardly so that produce thereon may roll onto a suitable conveyor or the like for further handling.

The rotation of the box inverting and dumping unit 83 is timed relative to the raising of a box so that the latter initially engages a downwardly facing grate 86 when the latter is horizontal. To then temporarily secure or clamp the ends of the box to the rotary grate for rotation therewith, the following arrangement for each such end is provided:

A hub 92 is turnably mounted in a support 93 secured to the shaft 84 on the outer face of the adjacent disc 85; the axis of the hub being parallel to the related grate 86. A finger 94 projects radially from the hub in a direction away from the shaft, and at its outer end is connected to a cross bar 95 parallel to said grate 86. This bar—adjacent its ends—carries prongs or spikes 96 adapted to project into the end of a grate engaged box through openings 97 in the disc 85. Normally, the prongs are kept clear of the laterally inner face of the disc and of the box by a spring 98 disposed between the disc and finger 94 and urging the latter away from the disc, as shown in FIG. 15.

Figure 16:
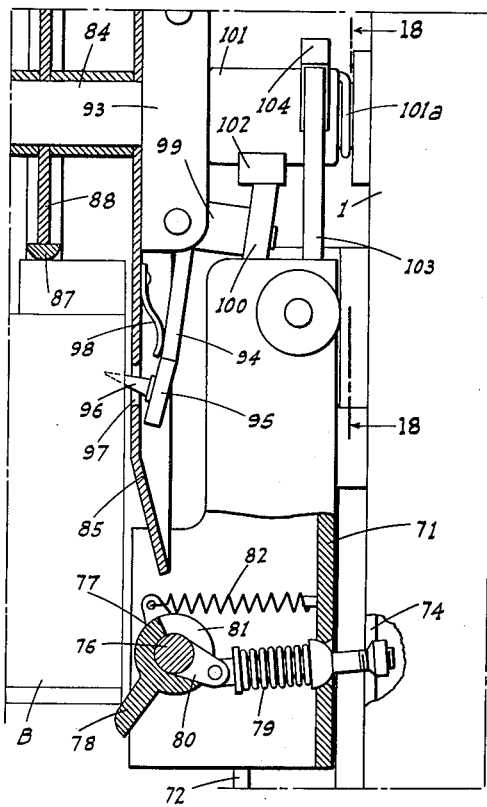
FIG. 16 is a similar view, showing the lifter further raised and the box holding spikes engaged therewith by reason of such further raising of the lifter.
Figure 17:
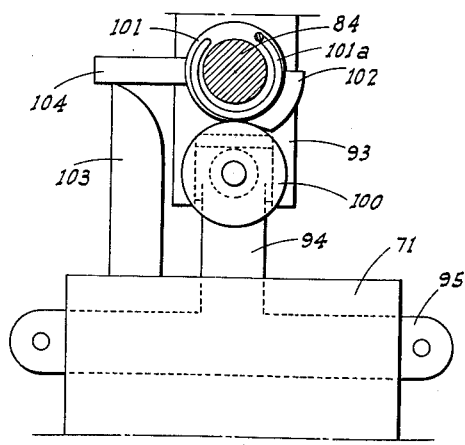
FIG. 17 is a fragmentary side view of the lifter and spike mounting and actuating device, taken on line 17—17 of FIG. 15.
Figure 18:
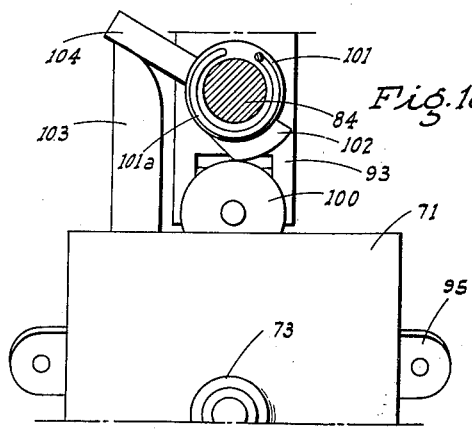
FIG. 18 is a similar view, taken on line 18—18 of FIG. 16.

A boss 99 is rigid with hub 92 and projects away from the disc substantially parallel to the shaft 84. The boss, on its outer end, carries a roller 100 normally riding the surface of an initially stationary sleeve 101 turnable on the shaft and engageable with a cam 102 on said sleeve. When the roller rides on this cam the finger 94 and cross bar 95 will obviously be forced toward the disc 85, and the spikes 96 will pass through openings 97 and into the adjacent end of the box in holding relation, as shown in FIG. 16. It will be noted that the spikes are then disposed at an angle in the direction of the adjacent grate 86, tending to hold the box firmly against said grate.

In order to give the spikes time to function after the box is first raised into engagement with the rotary grate, the carriages 71 are arranged to move further upward a certain distance; the box engaging lips 78 of the two carriages then yielding downwardly against the opposition of springs 79, and thus continuing to exert a pressure, holding the box in place.

In order to accelerate the action of the cam 102 on the roller 100 over what would otherwise be obtained as the rotary unit 83 slowly turns and the lifting carriages are on the final lap of their upward stroke, each carriage is provided with an upwardly projecting finger 103. This is disposed on the forward side of the sleeve 101 in position to engage a lug 104 projecting radially from said sleeve.

The sleeve is thus rotated, as the carriage moves upwardly, so as to advance the cam onto the roller; said sleeve and cam being thus rotated in a direction opposite that of the rotary box dumping unit 83 on which said roller 100 and associated parts are mounted. A suitable spring 101a restores the sleeve 101 to its normal position after the finger 103 leaves the lug 104 upon lowering of the carriage 71.

When the carriage 71 then lowers, the spring 79 restores the lip 78 to its normal horizontal position as soon as said lip clears the box. Then, as the lip encounters the end of another box which has in the meantime moved into position on the rollers 69, said lip is deflected upwardly against the resistance of the relatively light spring 82 until it passes below and clears the box. The lip is then restored by spring 82 to its initial position under the box, ready to engage and raise the same with the subsequent upward movement of the carriage.

It may be here stated that the movement of the box raising carriage and the rotation of the unit 83 are so timed relative to each other that the box supporting grate 86 not engaged by a box as previously described, will then be moved into position to receive said other box before the first box has been discharged from the rotary unit. This permits of a faster flow of boxes through the machine than would otherwise be possible, without having to speed up the rotation of the rotary unit to an extent that the desired gentle and relatively slow dumping or discharge of the produce from the boxes could not be obtained.

Each grate 86 includes box-side engaging and pushing flanges 105 at the trailing end of the grate bars; the direction of rotation of the rotary unit 83 being such as to move the boxes forwardly of the machine when they assume an inverted position above the shaft 84.

Figure 20:
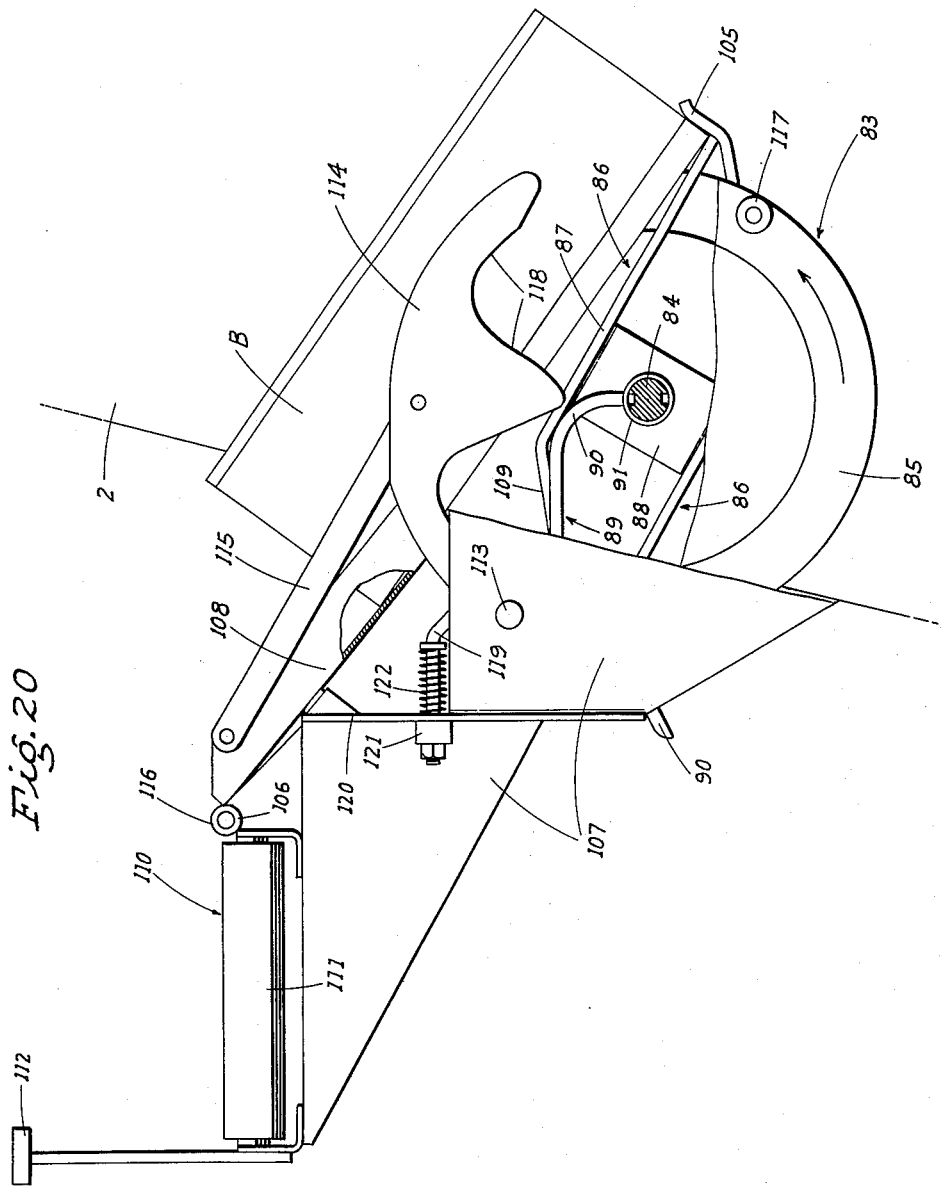
FIG. 20 is a similar view showing the box as upset or inverted to discharge its load, and as passing onto the box removing ramps.

As the unit 83 rotates, therefore, the box thereon gradually becomes inverted, as shown in FIG. 20, and the produce therein is gradually emptied therefrom, falling first onto the adjacent grate 86, and then—as the latter assumes a downward slope to the front end of the machine—such produce is projected onto the discharge or carry-off grate 89.

The arcuate extent of the cam 102 is such as to cause the spikes 96 to be held in the box until the latter has been tipped or inverted to a sufficient extent to be self-supporting on the grate 86.

Pivoted, as at 106, on brackets 107 rigid with and projecting forwardly from the frame housings 1 and 2, are ramps 108, preferably of angle form in section and spaced apart transversely of the machine to engage a box adjacent its ends thereon. These ramps are disposed at a normal downward angle to the rear from their pivoted end such that the leading end of a box being inverted will pass onto the ramps and be supported thereby when the box engaging grate 86 reaches an angle substantially that of—and becomes generally alined with—the ramps.

In order that the ramps will underlie the box as the latter moves into a position to engage said ramps without interference from the grate 86, the box engaging portion of the grate is shorter than the width of the box; the grate bars 87 at the leading end of the grate being angled away from the box, as shown at 109, so that the leading edge of the box is always clear of the grate.

Figure 21:
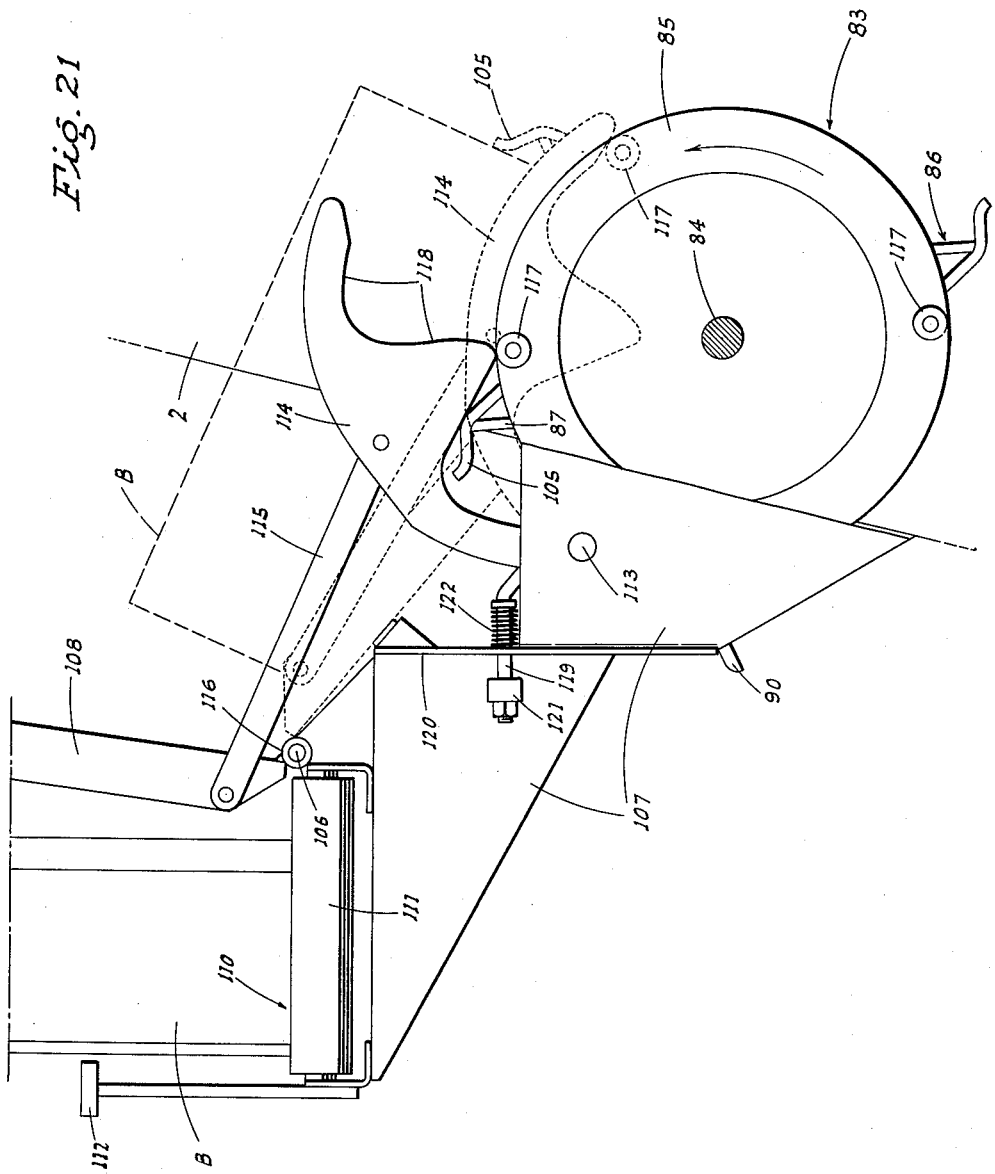
FIG. 21 is a similar view showing the box as transferred to the discharge conveyor; the position of the box just prior to the start of the transfer operation being shown in dotted lines.

As the rotary unit 83 continues the turn, the inverted box will be pushed along the ramps by the flanges 105 until its leading end reaches the forward end of the ramps, as shown in dotted lines in FIG. 21.

The ramps are then swung upwardly about the pivot 106 and the box is lifted clear of the rotary unit and finally deposited on edge on a suitable carry-off conveyor 110 supported from brackets 107 and extending transversely of the machine with a slight downward slope to one end.

The conveyor 110 preferably includes spaced box supporting rollers 111 disposed transversely of the conveyor, and back-stop rollers 112 are mounted along the side of the conveyor opposite the side to which the ramps feed, so that a box as discharged onto the conveyor by the tilting of the ramps cannot possibly tumble from the conveyor.

The ramps are tilted for the above purpose in properly timed relation to the rotation of the rotary unit 83 by the following means:

Pivoted at its forward end on bracket 107, as at 113, is a rearwardly extending cam plate 114 disposed above shaft 84 and adjacent but laterally out from one of the discs 85, as shown in FIG. 22. A link 115 connects the cam plate intermediate its ends and the adjacent ramp 108 relatively close to the pivot 106 so that upon upward swinging of the cam plate a certain distance, the ramp will be gradually swung up to a substantially vertical position as shown in FIG. 21. Both ramps will be simultaneously lifted by the one link and cam plate, since the ramps are rigidly connected as a unit by a sleeve 116 which surrounds the pivot pin 106.

The disc 85 carries a pair of opposed rollers 117 (one for each rotary grate) positioned to engage the lower cam edge 118 of the cam plate 114; said edge being shaped so that the cam plate, and the ramps, will be gradually lifted as a roller engages and rides along said edge 118 with the rotation of the disc 85.

A rod 119 is connected to the cam plate and is slidable through a flange 120 on the bracket 107, with a stop 121 on the rod on the front side of the flange which limits the downward swinging of the cam plate.

A compression spring 122 on the rod acts to return the cam plate to its initial lowered position after having been swung up.

Rotation of the different driven shafts hereinbefore described, as well as the reciprocation of the links 75 and 49, is controlled by the following described mechanism, contained in the main in housing 2, as shown in FIG. 3:

An electric motor 123 is mounted on housing 2 adjacent the upper end thereof and through a suitable train of reduction belt and chain drives 124, rotates the cam shaft 31 at a desired speed. Another reduction chain drive 125 connects the cam shaft 31 and a cross shaft 126 below chains 5 and on which chain drive sprockets 127 are mounted (see FIG. 7).

A rocking lever 128, extending lengthwise of the machine, is connected at its rear end to the upper end of link 49 and at its forward end is pivoted in the housing 2, as shown at 129. Intermediate its ends the lever 128 carries a transverse axis roller 130 which engages a cam 131 fixed on the cam shaft 31. This cam is designed to give lever 128 a relatively fast upward swing from an initially lowered position, and to then cause the lever to dwell for some time at the top of its movement before being again lowered.

Another longitudinally extending lever 132 below lever 128 and clear of the cam 131 is connected at its forward end to the lower end of link 75, and at its rear end is pivoted in the housing 2, as shown at 133. The levers intermediate their ends are connected by a link 134 so that both levers are moved up and down simultaneously but with different extents of movement at their free ends.

In order to avoid an undue accumulation of drives within the housing 2, the shaft 84 of the rotary box dumping unit 83 is driven from the cam shaft 31 by a reduction chain drive 135 within the housing 1, as shown in FIG. 1.

Said housing 1 also contains a cam 131a on cam shaft 31, and levers 128a and 132a corresponding to levers 128 and 132 and connected to the links 49 and 75, respectively, of the adjacent stack and box lifting carriages.

From the above description it will be seen that stacks of boxes as initially placed on the machine are successively razed, and the individual boxes thereof are successively lifted, inverted for the dumping of their loads, and such boxes then removed from the machine, without any manual handling or attention of any kind being necessary.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A box-content dumping machine comprising a support for a loaded open-topped box, a rotary dumping unit mounted above the support clear of the box thereon and having a flat box-top engaging grate adapted to be horizontal and downwardly facing in one position of the unit, means to limit a box into engagement with the grate when the latter is in such position, means to then releasably clamp the box to the unit for rotation therewith, and driving means to constantly rotate the dumping unit in one direction, said box lifting means comprising vertically reciprocating carriages on opposite sides of the support, lips projecting laterally and normally horizontally from the carriages for lifting engagement under a box on the support, and means mounting each lip on the related carriage comprising a turnable shaft parallel to the lip, an arm projecting radially from the shaft, a sleeve turnable on the shaft and rigid with the lip, the sleeve having an arcuate slot through which the arm projects and one end of the slot normally engaging one edge of the arm in a direction to prevent downward swinging of the lip and sleeve about the shaft, and a compression spring between the outer end of the arm and the carriage resisting rotation of the shaft except with a load on the lip in excess of the weight of a loaded box.

2. A machine, as in claim 1, in which the arcuate extent of the slot is greater than that of the arm whereby to allow of upward swinging of the lip and sleeve about the shaft from the normal position of the lip, and a spring between the sleeve and carriage resisting such rotation of the sleeve.

3. A box content dumping machine comprising a support for a loaded open-topped box, a rotary dumping unit mounted above the support clear of a box thereon, means to lift a box into engagement with the unit, the latter including a grate into contact with which the box is lifted, and means mounted on the unit and functioning upon and immediately subsequent to the initial engagement of the box with the grate to releasably clamp the box against the grate; said clamping means comprising spikes mounted on the unit at each side thereof substantially parallel to the grate and normally retracted from the ends of a box engaged with the grate, and means actuated upon continued upward movement of the lifting means after the box is so engaged and halted to advance the spikes into the ends of the box.

4. A box-content dumping machine comprising a support for a loaded open-topped box, a rotary dumping unit mounted above the support clear of a box thereon, means to lift a box into engagement with the unit, the latter including a grate into contact with which the box is lifted, spikes at each side of the unit radially out from the axis of the unit in position to project into the ends of a box engaged with the grate but initially retracted relative to the box ends, means mounting the spikes at each side on the unit for swinging movement about an axis at right angles to the axis of the unit, a roller mounted on the mounting means with its axis generally parallel to the axis of the unit and disposed radially out from the axis of said mounting means, and an initially stationary cam concentric with the axis of the unit and in the path of the roller and functioning when engaged by the roller upon rotation of the unit to cause said mounting means to be swung in a direction to advance the spikes into the adjacent box end.

5. A structure, as in claim 4, with means functioning immediately subsequent to the engagement of a box with the grate to move the cam into contact with the roller by rotation of the cam in a direction opposite that of the unit.

6. A structure, as in claim 5, in which the lifting means comprises, at each side of a box to be lifted, a vertically reciprocating carriage and a lifting lip on the carriage to engage under a box and mounted for downward yielding movement under a load in excess of the weight of a loaded box, and said cam moving means comprises a rotatable sleeve on which the cam is fixed, spring means resisting rotation of the sleeve, a lug projecting radially and substantially horizontally from the sleeve, and a finger on and upstanding from the carriage in position to engage the lug and rotate the sleeve upon movement of the carriage above the level required to engage the box with the grate.

7. A contents-dumping and box discharge machine for open-topped boxes comprising a rotary unit having a flat grate to engage over the open top of a box when said grate is downwardly facing, means to then releasably maintain the box in such engagement until said box is substantially inverted by rotation of the unit, said grate having leading and trailing ends and the leading end thereof terminating short of the leading end of the box, a ramp unit projecting forwardly at an initial upward incline from the rotary unit above the axis thereof in position to underlie the leading end of a box on the rotary unit when the box is inverted and to be then engaged by the box at its leading end, pusher elements on the grate at its trailing end engaging the box at its trailing end to push the same onto the ramp unit upon continued rotation of said rotary unit, a discharge conveyor extending from the forward end of the ramp unit, means pivoting the ramp unit in connection with the conveyor for upward swinging movement from the initially inclined position thereof to a substantially vertical position, and means functioning upon the box being substantially fully supported on the ramp unit to swing the same to a substantially vertical position whereby the box will be deposited on edge on the conveyor.

8. A machine, as in claim 7, in which said last named means comprises a cam plate disposed above the axis of the rotary unit in a plane at right angles to the axis thereof, means pivoting said plate at its forward end at a fixed point on the machine, a link connecting the cam plate intermediate its ends and the ramp unit adjacent its pivoted end, a cam face on the under side of the cam plate, and a roller mounted on the rotary unit radially out from the axis thereof in position to engage such face and lift the plate with resultant upward swinging of the ramp unit.

9. A structure, as in claim 7, in which the discharge conveyor extends transversely of the ramp unit and the width thereof is not materially greater than the height of a box; the pivot point of the ramp unit being disposed relative to the conveyor so that when the ramp unit is swung to a vertical position, the box engaging surface of the unit will be substantially alined with the adjacent edge of the conveyor, and back-stop members mounted on the conveyor above and along the opposite edge thereof.

10. A contents-dumping and box discharge machine for open-topped boxes comprising a rotary unit having a flat grate to engage over the open top of a box when said grate is downwardly facing, means to then releasably maintain the box in such engagement until said box is substantially inverted by rotation of the unit, said grate having leading and trailing ends and the leading end thereof terminating short of the leading end of the box, a ramp unit projecting forwardly at an initial upward incline from the rotary unit above the axis thereof in position to underlie the leading end of a box on the rotary unit when the box is inverted and to be then engaged by the box at its leading end, pusher elements on the grate at its trailing end engaging the box at its trailing end to push the same onto the ramp unit upon continued rotation of said rotary unit, a discharge conveyor extending transversely of the ramp unit from the forward end thereof and to which the ramp unit delivers, and means functioning to transfer the box from the ramp unit onto the conveyor upon the box being substantially fully supported on the ramp unit.

11. A box-content dumping machine comprising a support for a loaded open-topped box, a rotary dumping unit mounted above the support clear of the box thereon and having a flat box-top engaging grate adapted to be horizontal and downwardly facing in one position of the unit, means to lift a box into engagement with the grate when the latter is in such position, means to then releasably clamp the box to the unit for rotation therewith, drive means to constantly rotate the dumping unit in one direction whereby upon continued rotation of the unit the box will be inverted and the contents thereof supported by the grate, and a stationary carry-off grate arranged so that the box contents from the first named grate will roll thereon upon further rotation of the dumping unit beyond the initial inverted position of the box.

12. A structure, as in claim 11, in which each grate on the rotary unit comprises a plurality of spaced bars extending at right angles to the axis of the unit and the fixed grate comprises bars parallel to the first named bars and spaced to fit therebetween; the fixed grate bars projecting upwardly from below the level of the box supporting portion of the rotary grate from a point adjacent the rear end of such portion when the latter is facing upwardly, said fixed grate bars then extending rearwardly from above said rotary grate portion with an initial substantially horizontal portion and being then downwardly deflected on a slope to a rearward termination clear of the path of rotation of the rotary grate.

References Cited in the file of this patent

UNITED STATES PATENTS

| | | |
|---|---|---|
| 722,937 | Begg | Mar. 17, 1903 |
| 1,169,602 | Bausman | Jan. 25, 1916 |
| 1,967,719 | Morgan | July 24, 1934 |
| 2,459,204 | Van Vleck | Jan. 18, 1949 |
| 2,585,872 | Steiner | Feb. 12, 1952 |
| 2,667,281 | Perkins | Jan. 26, 1954 |
| 2,687,813 | Verrinder | Aug. 31, 1954 |
| 2,702,132 | Van Doren | Feb. 15, 1955 |